United States Patent [19]

Dauge et al.

[11] 4,394,885
[45] Jul. 26, 1983

[54] LOAD RECEIVER WITH IMPROVED FIXING MEANS

[75] Inventors: Gilbert V. Dauge, Lagny; Jacques F. Langlais, Coudray Montereaux; Daniel J. Quehen, Chilly Mazarin, all of France

[73] Assignee: Testut Aequitas, Paris, France

[21] Appl. No.: 229,156

[22] Filed: Jan. 28, 1981

[30] Foreign Application Priority Data

Feb. 4, 1980 [FR] France ............................... 80 02377

[51] Int. Cl.³ ........................ G01G 3/12; G01G 21/23
[52] U.S. Cl. .............................. 177/210 C; 177/229; 73/862.64
[58] Field of Search ............... 177/210 C, 229, 225, 177/255; 73/862.64

[56] References Cited

U.S. PATENT DOCUMENTS

| 4,037,675 | 7/1977 | Storace | 177/229 |
| 4,143,727 | 3/1979 | Jacobson | 117/229 X |
| 4,196,784 | 4/1980 | Suzuki | 177/211 |
| 4,208,905 | 6/1980 | Spoor | 73/862.65 |
| 4,237,989 | 12/1980 | Lewis | 177/210 C |
| 4,285,413 | 8/1981 | Dauge | 177/210 C |
| 4,308,929 | 1/1982 | Estavoyer | 117/229 X |

Primary Examiner—Joseph W. Hartary
Attorney, Agent, or Firm—Dressler, Goldsmith, Shore, Sutker & Milnamow, Ltd.

[57] ABSTRACT

This invention relates to load receivers in which a solid member with a constriction supplies the opposing elastic force. The connection between this solid member and the remainder of the load receiver is produced exclusively by pairs of bolts, tightly housed in bores of the solid member; each pair of bolts co-operates moreover with a part of the load receiver which has a lower rigidity than that of the material constituting the solid member. Such load receivers can be used in weighing apparatus.

8 Claims, 9 Drawing Figures

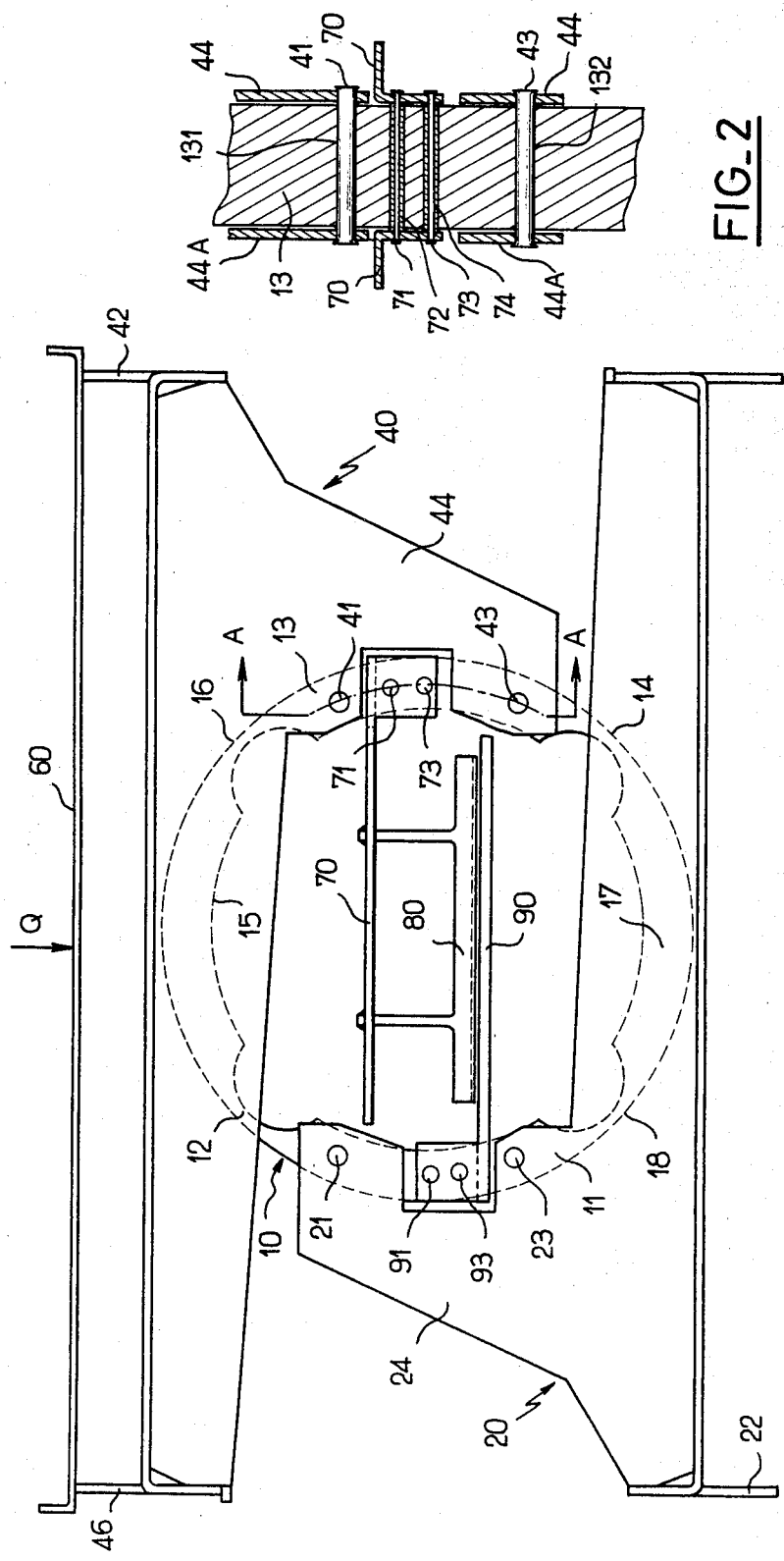

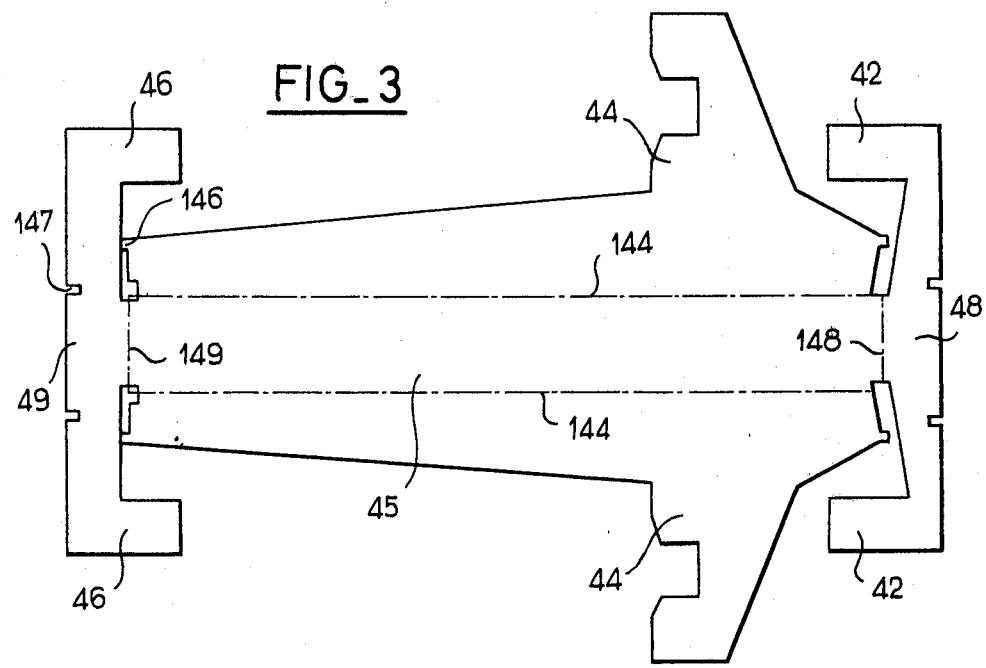
FIG_3
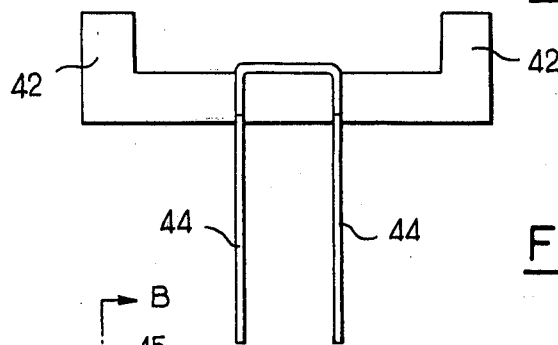
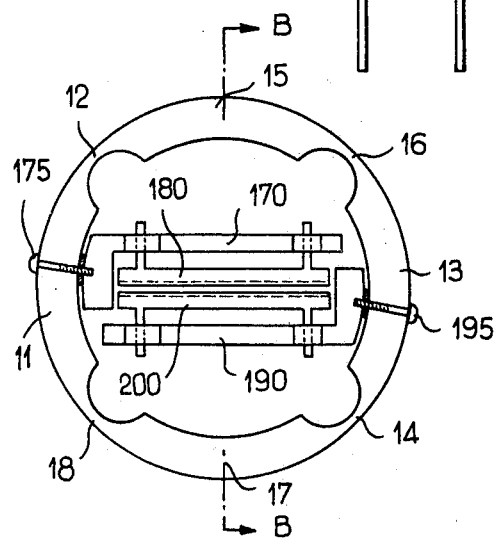
FIG_5
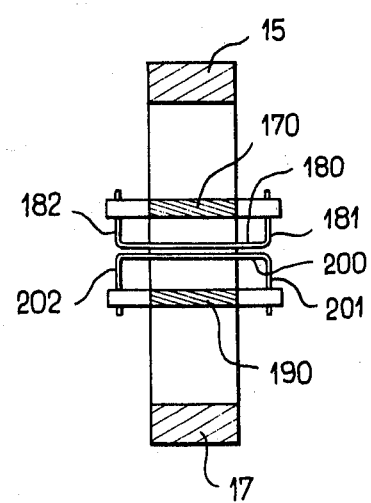
FIG_6

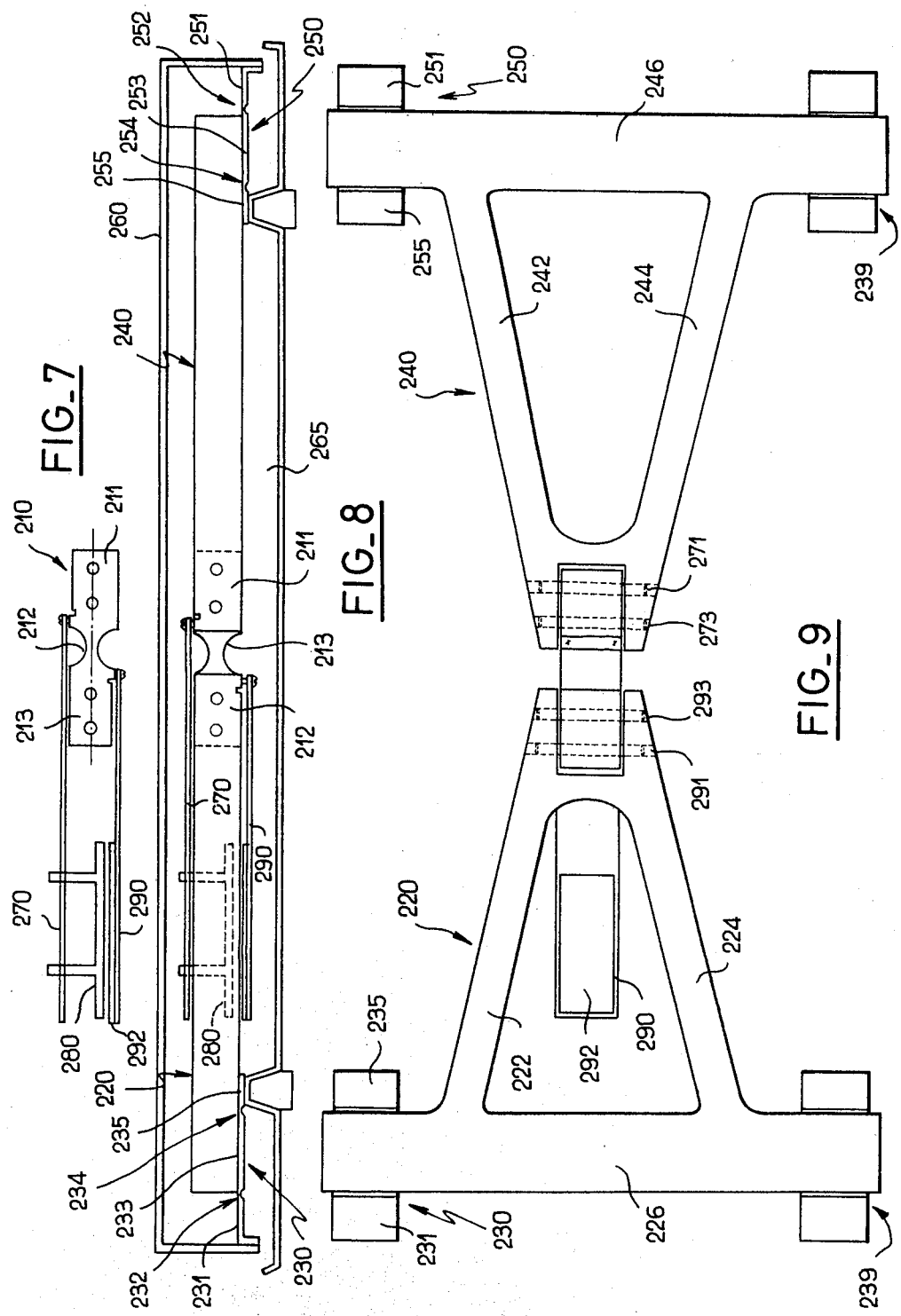

LOAD RECEIVER WITH IMPROVED FIXING MEANS

BACKGROUND OF THE INVENTION

This invention generally relates to weighing apparatus, and more particularly to the part thereof which is called the load receiver.

Load receivers are already known in which the force opposing the load is provided by a solid member which has at least one zone of the constriction type which is arranged to have an elastic response to stresses. Such load receivers have been described in U.S. patent applications Ser. Nos. 135,320, now U.S. Pat. No. 4,308,929, and 206,387 now U.S. Pat. No. 4,344,496, published as French publications Nos. 2,453,396 and 2,469,701, respectively, and U.S. Pat. No. 4,285,413.

A problem in such apparatus is to provide an attachment between the remainder of the load receiver and the solid member, without inducing deformations in the latter which are likely to disturb the measurement.

The present invention will provide an advantageous solution to this problem.

SUMMARY OF THE INVENTION

In the proposed load receiver, the connections between the solid member and the remainder of the load receiver are produced exclusively by lateral attachments, such as bolts or pins, housed in borings of the solid member. In this manner, relative movements are avoided between the solid member and the remainder of the load receiver in the zone surrounding their attachment points, such relative movements being hysteresis generators.

DESCRIPTION OF THE DRAWINGS

FIG. 1 is a lateral view of a first embodiment of the invention, in which a deformable parallelogram has the general form of a ring;

FIG. 2 is a sectional view along the line A—A of FIG. 1;

FIGS. 3 and 4 illustrate respectively in top view before bending and in end view after bending one of the parts of the load receiver of FIG. 1;

FIGS. 5 and 6 illustrate a variation of the attachment of the capacitive transducer in a load receiver of the type illustrated in FIG. 1;

FIG. 7 is a partial view illustrating the case in which the solid member is a bending blade;

FIG. 8 is a schematic sectional view of a bathroom scales comprising the bending blade of FIG. 7; and FIG. 9 is a partial top view of the bathroom scales of FIG. 8.

DETAILED DESCRIPTION OF THE INVENTION

The attachments are preferably positioned in the vicinity of the centre axial zone of the solid member, along which the deformations are minimal. In this context, the word "axial" indicates the axis of the solid member considered in cross section in the thickness thereof. The words "centre zone" indicate the zone surrounding this axis in the thickness of the solid member, as opposed to the zone close to the edges or sides thereof. The axis of the solid member naturally follows the geometry peculiar to the member and consequently may be curved.

The attachments are advantageously positioned substantially on the neutral line in deformation of the solid member.

In a preferred embodiment, the attachments are produced by pairs of bolts, positioned substantially symmetrically, along the axis of the solid member, over an interval separating one zone of the constriction type from another constricted zone or an end of the solid member.

In a first particular embodiment, the solid member is an integral assembly with four constrictions forming a deformable parallelogram, particularly of rectangular geometry or in a ring-shape; two opposite parts of this integral assembly are connected by a pair of bolts respectively to a part connected to the frame and to a part connected to the load-carrying plate. This embodiment applies in particular to household scales.

According to another embodiment of the invention, the solid member is a bending blade with a single constriction, both sides of this constriction being acted on by two lever members which are mounted substantially symmetrically, hinged on one side with the frame and on the other side with the load-carrying plate; the two lever members are each connected to the bending blade by a pair of bolts.

Other characteristics and advantages of this invention will be revealed from reading the detailed description which follows with reference to the accompanying drawings.

DESCRIPTION OF PREFERRED EMBODIMENTS

In FIG. 1, a deformable parallelogram of annular geometry, designated by the general reference number 10, is defined by four arcs 11, 13, 15 and 17, separated by four constrictions 12, 14, 16 and 18.

The remainder of the load receiver initially comprises a lower part 20, comprising in the lower region two feet 22 and 26 co-operating with the frame of the apparatus, and comprising in the top region two vertical plates, such as 24, forming a fork. Similarly, the top of the load receiver comprises a member 40, defined by two plates such as 44 which also form a fork, and two upper projections 42 and 46 which are attached to a load-carrying plate 60 which receives a load Q.

The two plates 24 are attached by bolts 21 and 23 in the arc 11 of the solid annular member. On the other side, the two plates 44 are attached by bolts 41 and 43 in the arc 13 of the solid annular member. On the same side, two other attachment devices 71 and 73 interlock a fork on the arc 13 and this fork is extended by a horizontal rib 70 in which vertical shanks which are integral with a first electrode 80 are attached, for example by soldering. For its part, the arc 11 of the solid annular member supports by two attachment devices 91 and 93 a fork integral with an extended horizontal plate 90, which defines the other electrode, or supports a material which is suitable for constituting the second electrode.

FIG. 2 shows in more detail the attachment of the member 40 on the ring 10, in its arc 13. Two bores 131 and 132 are made in this arc 13 and they tightly house the two bolts 41 and 43 which have already been mentioned. The bolts 41 and 43 are housed in turn in holes drilled in suitable locations of the two vertical members 44 and 44A. Instead of through bores, the attachments may naturally be housed in blind holes. Likewise, instead of bolts, it is possible to use piercings or hollowings which are made in the member 40.

It will be noticed that the section of FIG. 2 is produced at the level of the bolts along the axis in dashed lines and is of annular contour which may be considered as the centre axis of the solid member 10, taken in the thickness thereof. In this case, the bolts are thus positioned exactly on the axis of the solid member. It has been observed that attachments which are slightly shifted may be suitable, provided that the attachment is not at the border of the ring, along the thickness thereof; in other words, it has to remain in the vicinity of the centre axial zone of the solid member. In the present case, the bolts are in fact positioned on the axis which, in the case of a ring, substantially corresponds to the neutral line in bending deformation.

It should also be noted that the two bolts 41 and 43 are positioned substantially symmetrically, along the axis of the annular member 10, over an interval which separates the constriction 16 from the constriction 14. The two bolts are positioned respectively at a slight distance from the associated constrictions, while still maintaining the elastic qualities of the latter.

It will also be noted that the only contact between the members such as 44 and the ring 10 is produced by means of the bolts 41 and 43, a clearance existing moreover between the member 44 and arc 13. This allows a relative displacement without sliding between the solid member which is, in this case, of an annular shape and the remainder of the load receiver and hence there is a reversable mechanical attachment between the two assemblies.

FIG. 2 also shows the attachment of one of the electrodes in the preferred case of a capacitive transducer. The member 70 comprises two folded lateral lips which are attached in the vicinity of the median part of the arc 13 by bolts 71 and 73, which pass into the insulating cylindrical conduits 72 and 74, produced, for example, from a rigid plastics material. The same assembly is provided for the other electrode, the support 90 of which also has two lips overlapping both sides of the arc 11 and are attached by bolts 91 and 92 which pass through the arc 11 by means of insulating cylinders which are not shown.

FIGS. 3 and 4 indicate more precisely the nature of the member 40 which is the same as that of the member 20. In FIG. 3, the member 40 is illustrated before bending. It may be seen that it is of an entirely symmetrical structure with respect to the longitudinal axis thereof, with two wings 44, a centre part 45 and two end parts 48 and 49 which are respectively integral with two vanes such as 42 on one end and 46 on the other end. The wings 44 are folded towards the bottom along the axis 144. The end 48 is also folded towards the bottom along the axis 148; likewise, the end 49 is folded towards the bottom along the axis 149. Spurs such as 146 are then enaged in slits such as 147, with a folding or soldering attachment. The member then has the shape which appears in the lateral view in FIG. 1, and in a bottom view in FIG. 4.

FIGS. 5 and 6 illustrate a variation of the attachment of the capacitive electrodes. Although it is not absolutely necessary, the two electrodes 180 and 200 are controllable in this case in a relative position by shanks on their supports 170 and 190. The support 170 is attached by at least one screw 175 which radially traverses the arc 11, while the support 190 is attached by at least one screw which radially traverses the arc 13.

Here again, in order to avoid relative sliding movements between the electrode supports and the ring, their contact is advantageously restricted by a disc or a boss surrounding the attachment screw. FIG. 6 is a sectional view along the sectional line B-B of FIG. 5, and more clearly shows the exact form of the electrodes 180 and 200 which are produced in the form of a sheet iron plate where the shanks are cut, these then being folded at right angles, for example at 181 and 182, 201 and 202.

As described above, the solid member is composed in the form of a ring. Such a structure has already been described in French publication No. 2,469,701, to which reference should be made for greater detail. The solid member may in variation have the geometry of a true parallelogram. Examples of such a geometry are described in French publication No. 2,453,396, in the name of Testut-Aequitas, the descriptive content of which is also incorporated herein by reference, to illustrate other advantageous examples of use for the invention.

The present invention also applies to other embodiments of the solid member which defines in an elastic member the force opposing the load.

In numerous cases, particularly in that of bathroom scales, it is advantageous to use a bending blade to define this opposing force. Such a bending blade usually has the shape illustrated in FIG. 7. Defined by parallel generatrices and illustrated here in cross section, the bending blade has two portions 211 and 213, separated by a constriction 212. In the vicinity of the constriction 212, on one side thereof, in the upper part as illustrated, the support 270 of a first electrode 280 is attached. On the other side of the constriction 212 and in the lower part, the support 290 of a second electrode 292 is attached. In the example shown, the electrode 280 has shanks which allow its position to be controlled with respect to its support 270, when the electrode 292 is directly attached on its support 290.

FIG. 8 illustrates the use of a load receiver with a bending blade according to FIG. 7, in the particular case of a flat bathroom scales. This comprises an upper load-carrying plate 260, and a lower frame 265 provided with feet. Hinge means 230 and 250 as well as 239 and 259 (FIG. 9) are defined by elastic joints, composed of thin sheet iron, provided with constrictions.

Thus, in the left-hand side of FIG. 8, such a double elastic joint may be seen, designated by the general reference number 230, another double hinge of the same type being designated by the general reference number 250. The reference numbers in both cases vary by twenty units. Thus, only the double hinge 230 will be described which comprises a first portion 231, integral with the load-carrying plate 260; this first portion 231 is separated by an extended constriction 232 from a centre portion 233, which is integral with a lever piece indicated by the general reference number 220. For its part, the centre portion of the elastic joint 233 is connected by a constriction 234 to the end portion 235 which comes to rest on the lower frame 265 level with one of the feet. As may be seen in FIG. 9, the double joints described above are four in number, and the constrictions are aligned in pairs, for example between the portion 231 and the portion 239 of FIG. 9.

These portions 231 and 239 of FIG. 9 support the transverse arm 226 of the lever member 220, and this transverse arm 226 is integral with two oblique arms 222 and 224 which are joined at the centre of the Figure to form a kind of fork surrounding the bending blade 210, but without having frictional contact therewith. The same assembly is produced by the other lever member 240, the transverse arms 246 of which rests in articulation on the elements 250 and 259. Here again, this transverse arm 246 is integral with two oblique arms 242 and 244 which join to surround the other end 211 of the bending blade 210, without having direct contact therewith.

Finally, according to the essential characteristic of this invention, each of the lever members 220 and 240 co-operates with the end of the bending blade which is associated therewith by means of bolts, 271 and 273 for the member 240, 291 and 293 for the member 220, these bolts being tightly housed in bores made in the bending blade 210. Here again, the previously described variations (blind piercings and/or projecting hollowings of the members 220 and 240) also apply.

From studying FIG. 7, it may be seen that as before, the bores made in the bending blade are level with the longitudinal axis thereof, and therefore in a centre zone, and preferably substantially on the neutral deformation line of the bending blade.

Here again, two bolts of each pair, for example 271 and 273, are positioned substantially symmetrically along the axis of the bending blade, over the interval which separates the right-hand end of the portion 211 from the edge of the constriction 212. At first glance, it seems from FIG. 7 that this symmetry is not completely verified. In fact, as the capacitive transducer is attached here very close to the constriction, it is necessary to attach the bolt 273 at quite a distance to maintain the elastic qualities not only at the level of the constriction, but also at that of the neighbouring electrode attachment of the constriction. With this reservation, it may also be stated that the two bolts are positioned substantially at a quarter and at three quarters of the interval included between the vertical of the transducer attachment 270 and the extreme edge of the portion 211. It will be noted that the only contact between the members 220 or 240 and the bending blade 210 is made at the level of the lateral attachments, in this case by bolts.

As previously indicated, this second embodiment applies very particularly to bathroom scales; however, it is naturally capable of other uses. Concerning the structural variations thereof, reference may be made to patent application no. 79 11 457 which has already been mentioned, in the name of Testut-Aequitas, the descriptive contents of which are to be considered as incorporated herein by reference.

This invention is naturally not restricted to the embodiments which have been described, but it extends to any variation consistent with the spirit thereof.

We claim:

1. A load receiver for use in a weighing scale or the like comprising:

a solid member having opposed lateral surfaces and at least one constricted zone arranged to provide an elastic response to stresses;

first and second support members, each of said support members including opposed connector portions for supporting said solid member therebetween; and attachment means rigidly connecting said connector portions to said solid member with said connector portions in fixed spaced relationship with the lateral surfaces of said solid member.

2. A load receiver according to claim 1, wherein at least one bore is formed in said solid member on each side of said constricted zone in the vicinity of the centre axial zone of the solid member, and said attachment means are positioned in said bores.

3. A load receiver according to claim 2, wherein said attachment means are substantially positioned on the neutral line in deformation of the solid member.

4. A load receiver according to claim 1, wherein said attachment means comprise bolts positioned in pairs substantially symmetrically along the axis of the solid member, on an interval separating one zone of the constriction type from another constricted zone or from an end of the solid member.

5. A load receiver according to claim 1, wherein said solid member comprises an integral loop with four constrictions forming a deformable parallelogram, and wherein two opposite parts of said loop are connected by a pair of bolts respectively to said first support member and to said second support member.

6. A load receiver according to claim 5, which also comprises a capacitive transducer rigidly connected to said opposite parts of said loop between the said pairs of bolts, and wherein the said pairs of bolts are positioned at a slight distance from the constrictions, while still maintaining the elastic qualities thereof.

7. A load receiver according to claim 1, wherein the solid member is a bending blade with a single constriction, and said support members comprise lever members, both sides of this constriction being acted on by said lever members which are mounted substantially symmetrically in articulation on one side with the frame of a weighing scale and on the other side with the load-carrying plate of said scale, and wherein the lever members are each connected to the bending blade by a pair of bolts.

8. A load receiver according to claim 7, which also comprises a capacitive transducer rigidly connected to the bending blade on both sides of the constriction thereof and in the immediate vicinity of the latter, and wherein said bolts are positioned at a sufficient distance from the constriction so as not to disturb the elastic behaviour of the bending blade where the capacitive transducer is supported.

* * * * *